United States Patent
Yuan

(10) Patent No.: US 6,634,975 B2
(45) Date of Patent: Oct. 21, 2003

(54) FLEXIBLE DRIVE RING BELT

(75) Inventor: Jing Yuan, Rochester Hills, MI (US)

(73) Assignee: The Gates Corporation, Denver, CO (US)

( * ) Notice: Subject to any disclaimer, the term of this patent is extended or adjusted under 35 U.S.C. 154(b) by 17 days.

(21) Appl. No.: 09/788,037

(22) Filed: Feb. 16, 2001

(65) Prior Publication Data

US 2002/0115513 A1 Aug. 22, 2002

(51) Int. Cl.⁷ .............................. F16G 1/28; F16G 5/22
(52) U.S. Cl. ....................................... 474/242; 474/201
(58) Field of Search ................................. 474/201, 242, 474/244, 245, 237, 238, 266, 265, 202

(56) References Cited

U.S. PATENT DOCUMENTS

| 4,303,403 A | * | 12/1981 | Lamers ........................ 474/201 |
| 4,484,903 A | * | 11/1984 | Schneider ..................... 474/242 |
| 4,579,547 A | | 4/1986 | McComber et al. ......... 474/201 |
| 4,604,082 A | * | 8/1986 | Hattori ......................... 474/242 |
| 4,612,005 A | * | 9/1986 | Miranti, Jr. .................. 474/244 |
| 4,692,130 A | | 9/1987 | Novak ......................... 474/201 |
| 4,741,727 A | | 5/1988 | Hattori et al. ............... 474/268 |
| 4,950,212 A | | 8/1990 | Masuda et al. .............. 474/242 |
| 5,007,884 A | | 4/1991 | Masuda et al. .............. 474/242 |
| 5,169,369 A | | 12/1992 | Masuda et al. .............. 474/242 |
| 5,242,332 A | * | 9/1993 | Douhairet et al. .......... 474/201 |
| 6,030,308 A | | 2/2000 | Beck ........................... 474/254 |
| 6,306,055 B1 | * | 10/2001 | Serkh ........................... 474/201 |

FOREIGN PATENT DOCUMENTS

| GB | 2030263 A | * | 4/1980 |
| JP | 5950252 A | * | 3/1984 |
| JP | 5954838 A | * | 3/1984 |
| JP | 62-35136 A | * | 2/1987 |

* cited by examiner

Primary Examiner—Marcus Charles
(74) Attorney, Agent, or Firm—J. A. Thurnau, Esq.; C. H. Castleman, Esq.; S. G. Austin, Esq.

(57) ABSTRACT

A flexible drive ring CVT belt comprises a flexible drive ring having a plurality of adjacent ring segments. The segments comprise metallic or non-metallic material sufficient to bear a compressive load imposed by CVT sheaves. The segments are interlocked along a longitudinal axis and are preloaded in the assembled position by an elastomeric member. A tensile member or belt bears on an outer circumferential bearing surface formed by the interlocked segments. The tensile member is moveable along a longitudinal axis relative to the flexible drive ring on the circumferential bearing surface. The segments further comprise opposing inclined surfaces for engaging sheave surfaces on a pulley.

10 Claims, 2 Drawing Sheets

FLEXIBLE DRIVE RING BELT

FIELD OF THE INVENTION

The invention relates to power transmission belts, and more particularly to flexible drive ring belts having a flexible drive ring comprising segments and a tensile member.

BACKGROUND OF THE INVENTION

It is well known in the art that a gear type transmission may be used for running a motor vehicle, motorcycle or the like. However, gear type transmissions generally have a fixed number of gears. They are usually designed to operate most efficiently in one of the gears, leaving the others to cause the engine to run at less efficient operating points. Consequently, for the purpose of improving efficiency a continuously variable transmission, CVT, is preferable. CVT transmissions require belts specially adapted for such use.

Various types of power transmission belts have been developed for use in continuously variable transmissions, or CVT's.

Generally, CVT belts have a silhouette similar to that of a conventional V-belt. In particular, they are broad at the top and narrow at the bottom and designed to fit between the sheaves of a pulley defining an angular groove. The pulley on which the belt is trained generally will comprise a moveable sheave and a fixed sheave, each having a truncated cone shape. Generally, one of the sheaves moves while the other remains fixed.

Moving one sheave in relation to the other varies the effective diameter φ of the pulley within which the belt operates. Belt speed is a function of the effective diameter of the pulley that is, in turn, a function of the axial position of the sheaves relative to each other.

CVT type belts in the prior art include belts comprising a plurality of blocks connected transversely to a tensile member. Certain forms of cog type belts are also known.

Representative of the art is U.S. Pat. No. 4,595,387 (1986) to McComber which discloses a V-block type belt with polymeric portions oriented transversely to the belt. The polymeric portions are fixedly connected along a longitudinal axis of the belt at predetermined intervals.

The prior art teaches fixing the position of transverse blocks relative to a tensile load carrying member. Consequently, the prior art teaches the use of transverse blocks constructed to precisely mechanically connect with the tensile member. Relative movement of the components is strictly controlled.

Also representative of the art is U.S. Pat. No. 4,734,085 (1988) to Takashima et al. which discloses a v-belt to be used in a dry type transmission comprising an endless load carrier having a series of cogs by which transversely mounted blocks are engaged to the load carrier.

The prior art belts have the effect of concentrating bending forces experienced by the tensile member at those points where the tensile member contacts each segment. In operation, repeated flexing at these locations cause tensile cord failure. Generally, the prior art belt construction is one of an interconnected, relatively stiff assembly. The segments are attached to flexible tensile member by clamping or through some form of interference fit.

What is needed is a flexible drive ring belt having a flexible drive ring. What is needed is a flexible drive ring belt having a tensile member cooperatively engaged with the flexible drive ring. What is needed is a flexible drive ring belt having a flexible drive ring comprising a plurality of fixed ring segments that are not fixed to a tensile member. What is needed is a flexible drive ring belt having an elastic member for preloading the flexible drive ring. The present invention meets these needs.

SUMMARY OF THE INVENTION

The primary aspect of the present invention is to provide a flexible drive ring belt having a flexible drive ring.

Another aspect of the invention is to provide a flexible drive ring belt having a tensile member cooperatively engaged with the flexible drive ring.

Another aspect of the invention is to provide a flexible drive ring belt having a flexible drive ring comprising a plurality of ring segments that are not fixed to a tensile member.

Another aspect of the invention is to provide a flexible drive ring belt having an elastic member for preloading the flexible drive ring.

Other aspects of the invention will be pointed out or made apparent by the following description of the invention and the accompanying drawings.

The invention comprises a flexible drive ring CVT belt. It comprises a flexible drive ring having a plurality of adjacent ring segments. The segments comprise metallic or non-metallic material sufficient to bear a compressive load imposed by CVT sheaves. The segments are interlocked along a longitudinal axis and are preloaded in the assembled position by an elastomeric member. A tensile member or belt bears on an outer circumfrential bearing surface formed by the interlocked segments. The tensile belt may comprise any belt known in the art, for example a multi-ribbed power transmission belt. The tensile belt is moveable along a longitudinal axis on the circumfrential bearing surface. The segments further comprise opposing inclined surfaces for engaging sheave surfaces on a pulley.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DESCRIPTION OF THE PREFERRED EMBODIMENT OF THE INVENTION

Figure 1:
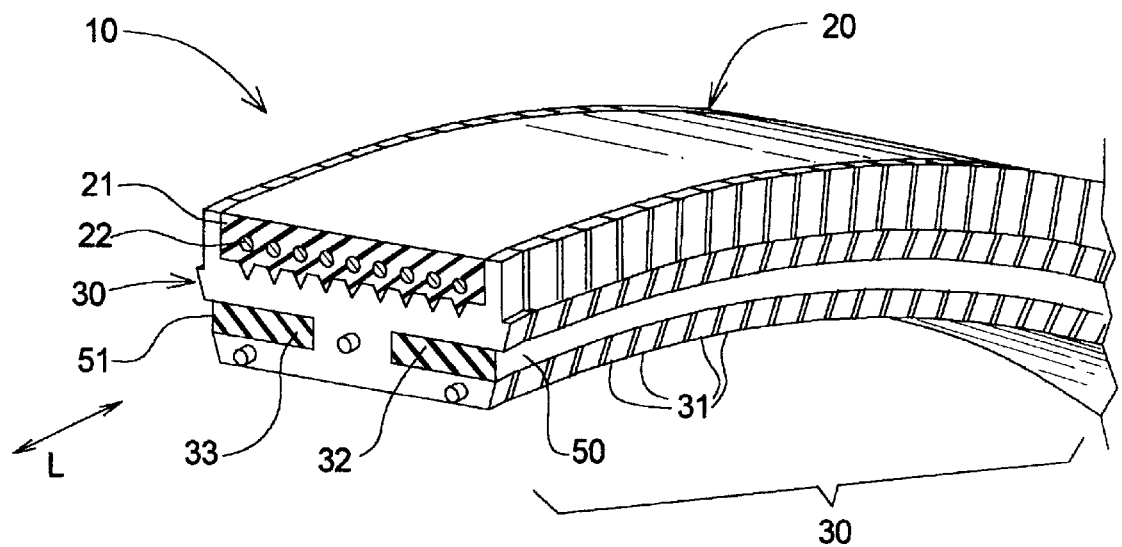
FIG. 1 is a cross-sectional perspective view of the invention.

FIG. 1 is a cross-sectional perspective view of the invention. Flexible drive ring belt 10 comprises tensile member or belt 20 engaged with flexible drive ring 30. Tensile belt 20 may comprise any power transmission belt known in the art, including a multi-ribbed belt or v-belt. This is a particular advantage of the invention because as the belt 20 wears out, it may be replaced by another inexpensive and readily available multi-ribbed belt. The prior art CVT belts have no such part replacement construction and must be discarded and totally replaced when they wear out, usually at significant cost. The tensile belt generally comprises an elastomeric material 21 surrounding a plurality of tensile cords 22.

Flexible drive ring 30 comprises ring segments 31. Segments 31 are arranged adjacent to each other to create an endless form. Elastomeric members 50, 51 engage each segment 31 in slots 32, 33, respectively, in order to hold the segments in the proper operational arrangement. Slots 32, 33 are disposed between surface 34 and an apex of angle 13, see FIG. 3. The elasromeric members may be highly resilient like a rubber band or be resistant to axial elongation. The elastomeric members may comprise the same material as the tensile belt, and may or may not contain a tensile cord, depending on the needs of a user. In the preferred embodiment the elastomeric members do not contain tensile cords.

Figure 3:
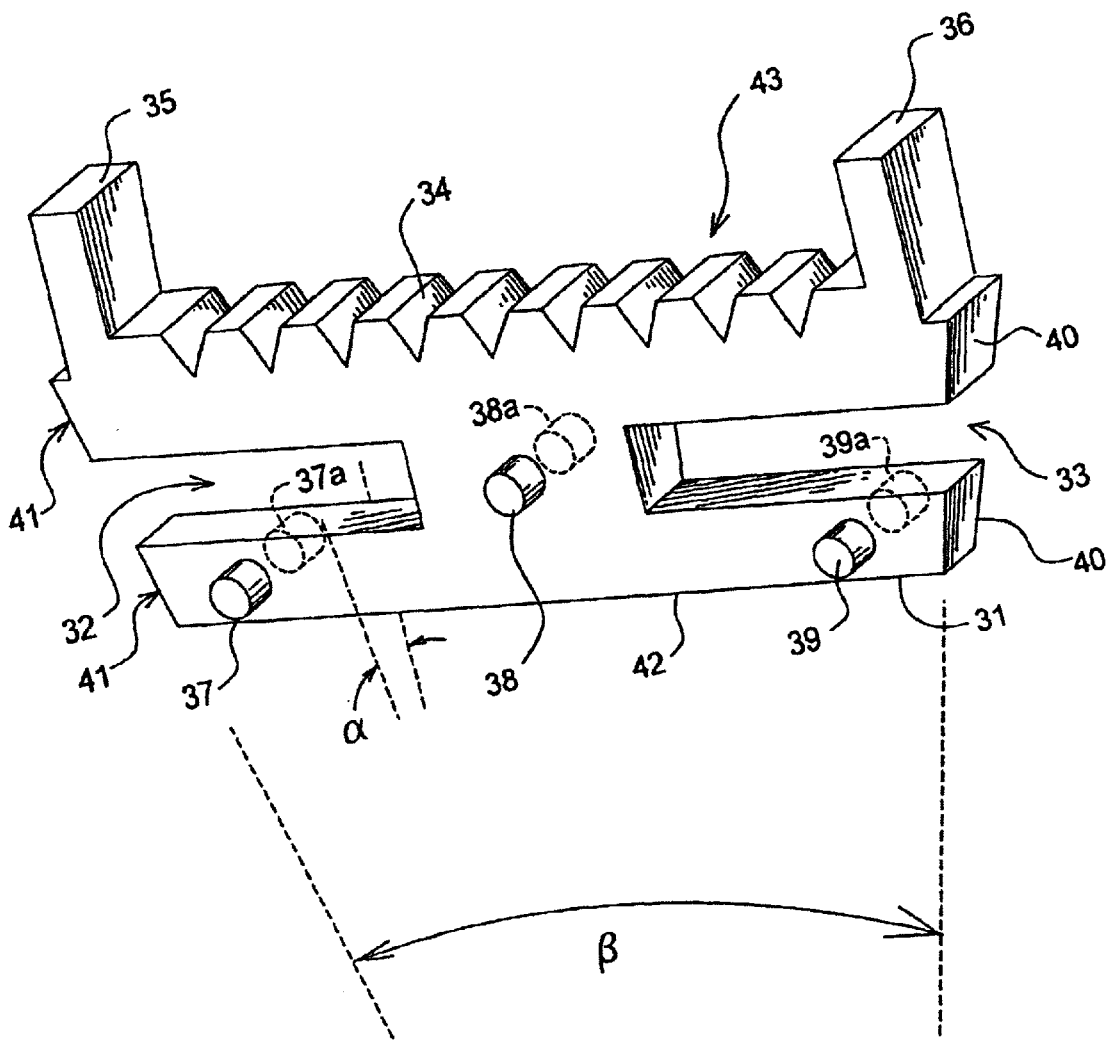
FIG. 3 is a perspective view of a flexible drive ring segment.

A total circumference of the flexible drive ring 30 is slightly longer than an elastomeric member length, so that when the invention is fully assembled, a pre-load is established in the elastomeric members and thereby in the ring itself, thereby realizing the interlocking feature of each adjacent segment, see FIG. 3.

Figure 2:
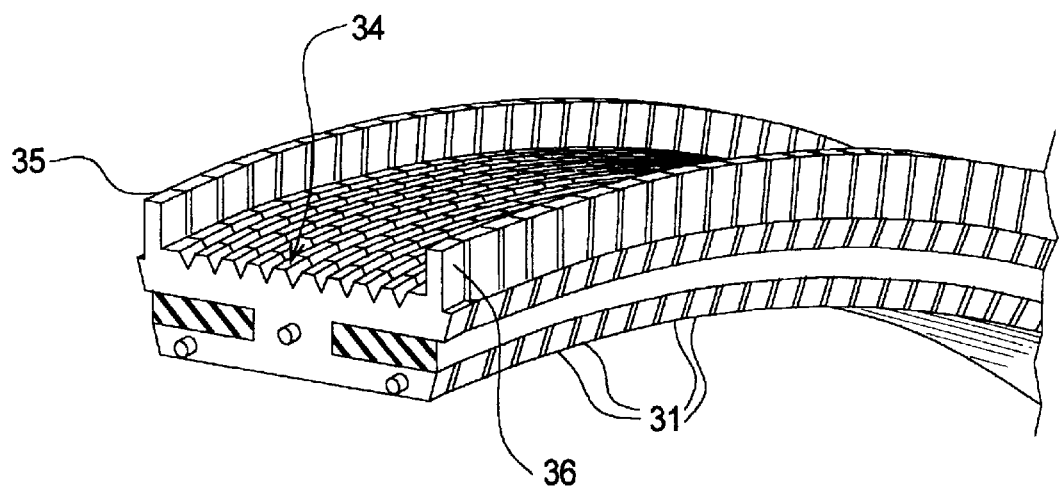
FIG. 2 is a cross-sectional view of the flexible drive ring.

FIG. 2 is a cross-sectional view of the flexible drive ring. Each segment 31 has a belt bearing surface 34. The bearing surface 34 may describe a profile as necessary to cooperatively engage any form or profile of belt known in the art. The form may include ribbed, flat or v-belt profile. The preferred embodiment profile depicted in FIG. 2 describes a multi-ribbed belt profile. Opposing projections or tabs 35, 36 are located on either side of the bearing surface 34. Tabs 35, 36 laterally hold the belt in place on the flexible drive ring. The tabs also provide protection for the side of the belt during operation.

The bearing surface of each segment in the ring taken in total comprises a circumfrential surface upon which the tensile belt 20 bears, see FIG. 1. Tensile belt 20 is only laterally controlled on the surface 34 to prevent the belt from tracking or running off the bearing surface 34 during operation. Belt 20 and flexible drive ring 30 may move relative to each other in a longitudinal, axial direction L. In operation, this allows belt 20 to move slightly with respect to the flexible drive ring 30 and thereby with respect to each segment for each rotation of the flexible drive ring through a pulley. This evenly distributes belt bending stresses between each segment over the full length of the tensile belt 20. This allows the belt to wear uniformly along its entire length, thereby increasing its useful life.

FIG. 3 is a perspective view of a flexible drive ring segment. Convex protrusions 37, 38, 39 extend from one of the opposing surfaces, in this rig. 3 from opposing surface 42. Mirror image concavities are located on the reverse opposing surface 43. Protrusions 37, 38, 39 each cooperatively engage the corresponding concavity 37a, 38a, and 39a respectively on an adjacent segment. The engaged protrusions and concavities interlock each segment in proper alignment as the flexible drive ring belt tracks through a pulley.

In the preferred embodiment opposing surfaces 42, 43 may describe an included angle α. Angle α allows each segment to rotate slightly relative to each other and thereby remain substantially aligned with a center of rotation as the flexible drive ring belt tracks through a pulley during operation.

Opposing inclined surfaces 40, 41 each bear upon a surface on a pulley (not shown). The opposing inclined surfaces have an included angle β that is substantially equivalent to the included angle of a pulley in which the invention is trained. This assures proper contact between the flexible drive ring belt and the pulley for efficient power transmission.

In the preferred embodiment, a coefficient of friction (COF) of COF=0.3 and β=34°; or COF=0.2 and β=26°. These values are offered by way of example and not as limitations. Since the tensile belt is well known and widely available, the flexible drive ring belt does not require lubrication such as an oil bath or spray to operate properly. This feature significantly simplifies the lubrication requirements of any transmission using the inventive belt.

Each segment may comprise substantially a non-metallic or plastic material having a desired axial strength to undertake a sheave axial load. Each segment may also comprise a metallic core or body, such as aluminum, overmolded with non-metallic, such as phenolic or plastic, at the sheave contact surfaces 40, 41.

Although a single form of the invention has been described herein, it will be obvious to those skilled in the art that variations may be made in the construction and relation of parts without departing from the spirit and scope of the invention described herein.

I claim:

1. A belt comprising:

a plurality of segments arranged adjacent to each other such that an endless member is formed;

each segment having opposing inclined surfaces for engaging a pulley side, the opposing inclined surfaces describing an included angle;

at least one retaining member engaged to each segment whereby the segments are retained adjacent to each other;

a tensile member having a multiple-ribbed profile bearing upon a circumferential bearing surface, the circumferential bearing surface being formed by the adjacent segments; and as least one slot for receiving the retaining member, the slot disposed between the circumferential bearing surface and the included angle apex.

2. The belt as in claim 1, wherein each segment further comprises:

opposing surfaces, whereby each segment bears upon on opposing surface of an adjacent segment;

a convex protrusion extending from an opposing surface;

a concavity in the other opposing surface such that the protrusion from a segment cooperatively engages the concavity in an adjacent segment.

3. The belt as in claim 2, wherein each segment further comprises opposing projections for laterally retaining the tensile member in each segment.

4. The belt as in claim 1, wherein the circumferential bearing surface describes a profile for cooperatively engaging the tensile member.

5. The belt as in claim 4, wherein the tensile member bears on the circumferential surface such that a relative axial movement may occur between the tensile member and the segments.

6. The belt as in claim 5, wherein each of the opposing inclined surfaces have a predetermined coefficient of friction.

7. The belt as in claim 6, wherein a protrusion and concavity on a segment are each located on a pitch line diameter.

8. The belt as in claim 6, wherein an axis of the tensile member is aligned with a neutral axis of the belt during operation.

9. The belt as in claim 8, wherein an axis of the retaining member is aligned with a neutral axis of the belt during operation.

10. The belt as in claim 8, wherein the retaining member comprises elastomeric material.

* * * * *